(12) United States Patent
Amrany et al.

(10) Patent No.: US 6,534,996 B1
(45) Date of Patent: Mar. 18, 2003

(54) SYSTEM AND METHOD FOR PHONE LINE CHARACTERIZATION BY TIME DOMAIN REFLECTOMETRY

(75) Inventors: Daniel Amrany, Wayside, NJ (US); Marc Delvaux, Metuchen, NJ (US)

(73) Assignee: Globespanvirata, Inc., Red Bank, NJ (US)

(*) Notice: Subject to any disclaimer, the term of this patent is extended or adjusted under 35 U.S.C. 154(b) by 57 days.

(21) Appl. No.: 09/816,506

(22) Filed: Mar. 23, 2001

Related U.S. Application Data

(60) Provisional application No. 60/192,263, filed on Mar. 27, 2000.

(51) Int. Cl.[7] .............................................. G01R 31/11
(52) U.S. Cl. ........................ 324/533; 324/527; 702/108
(58) Field of Search ................................ 324/533, 534, 324/532, 527; 702/108

(56) References Cited

U.S. PATENT DOCUMENTS 6,177,801 B1 * 1/2001 Chong ........................ 324/532
6,266,395 B1 * 7/2001 Liu ............................. 324/533

OTHER PUBLICATIONS

Merriam–Webster's Collegiate Dictionary, 10th ed., Springfield, MA, 2001, p. 379.*

Authorative diction of IEEE Standards Terms, 7th ed., New York, NY, 2000, p. 701.*

Academic Press Dictionary of Science and Technologn, San Diego, CA, 1992, p. 2224.*

* cited by examiner

Primary Examiner—Christine K Oda
(74) Attorney, Agent, or Firm—Thomas, Kayden, Horstemeyer & Risley

(57) ABSTRACT

A system and method for characterizing a transmission line in a digital subscriber line (DSL) system. Broadly, the method uses DSL system components, which are configured to perform time domain reflectometry (TDR), in order to determine transmission line characteristics.

44 Claims, 13 Drawing Sheets

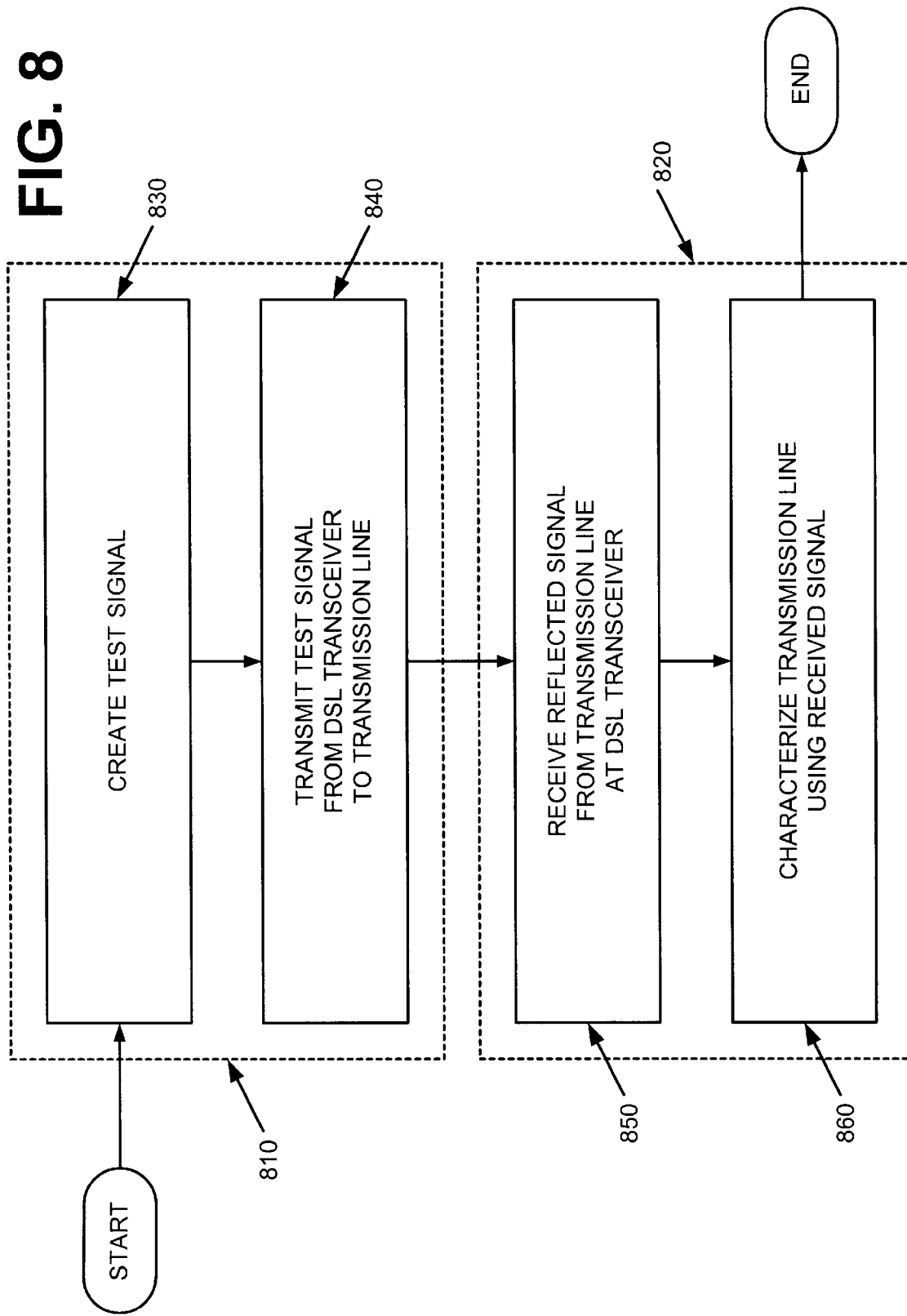

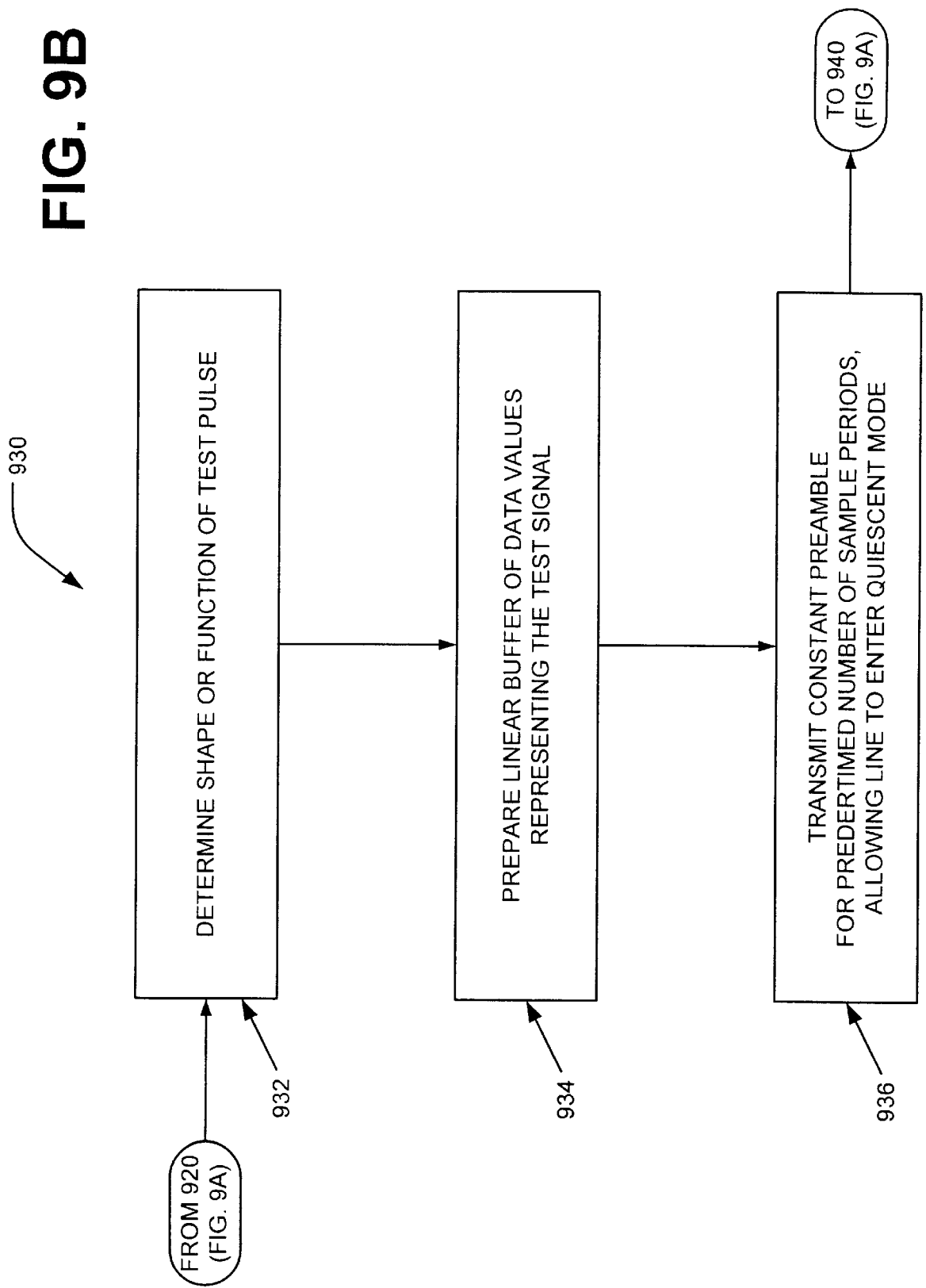

SYSTEM AND METHOD FOR PHONE LINE CHARACTERIZATION BY TIME DOMAIN REFLECTOMETRY

CROSS-REFERENCE TO RELATED APPLICATION

The present application claims the benefit of the filing date of U.S. patent application Ser. No. 60/192,263, filed on Mar. 27, 2000, and entitled "Phone Line Characterization by Time Domain Reflectometry," the contents of which are hereby incorporated by reference.

FIELD OF THE INVENTION

The present invention generally relates to high-speed data communications. More specifically, the invention relates to a system and method for line characterization within a digital subscriber line (DSL) system using time-domain reflectometry (TDR).

BACKGROUND OF THE INVENTION

Line characterization remains a problem in digital subscriber line (DSL) systems, and especially in asymmetrical DSL (ADSL) systems. Typically, phone companies rely on automated test equipment for line characterization at low frequencies. Upon request from a management system, the transmission line is disconnected from the line termination equipment, and a test bus is coupled to the transmission line. This test bus is serviced by centralized test equipment, which tests the integrity of the line. The test equipment typically measures the direct current (DC) resistance of the loop with its terminating set of phones rather than measuring alternating current (AC) resistance. Although the DC resistance provides information about the loop length, it may not identify other impairments that affect the performance of the DSL, which typically operates at a predetermined frequency range. Furthermore, disconnection of the transmission line and the insertion of a test bus may produce disturbance effects and further influence the measurement of line characteristics.

Therefore, there is a need in the industry for a system and method of characterizing transmission lines without using test equipment that may introduce disturbance effects. Moreover, in the context of DSL and ADSL systems, there is a need for a system and method of characterizing transmission lines at frequencies used in DSL in order to identify impairments that may not be detectable from DC resistance measurements.

SUMMARY OF THE INVENTION

The present disclosure relates to a system and method for characterizing transmission lines used in digital subscriber line (DSL) systems. The system can be broadly conceptualized as a DSL system in which the DSL system components are configured to analyze the characteristics of a transmission line using time domain reflectometry (TDR).

Briefly described, a transmitter transmits a predetermined test signal from a point of origin to a DSL transmission line. The transmission line reflects a portion of the signal back to the point of origin where a receiver receives the reflected signal. This reflected signal is analyzed to determine transmission line characteristics.

In architecture, the system comprises a transmitter configured to transmit the predetermined test signal, a receiver configured to receive the reflected signal, and an analyzer configured to determine transmission line characteristics as a function of the received signal and the transmitted signal.

The features and advantages of the invention will become apparent upon reading the following specification, when taken in conjunction with the accompanying drawings.

BRIEF DESCRIPTION THE DRAWINGS

The invention can be better understood with reference to the following drawings. The components in the drawings are not necessarily to scale, emphasis instead being placed upon clearly illustrating the principles of the present invention.

FIG. 8 is a flow chart showing the method steps for TDR.

FIG. 9B is a flow chart showing the steps for creating the test signal of FIG. 9A in more detail.

DETAILED DESCRIPTION

Figure 1:
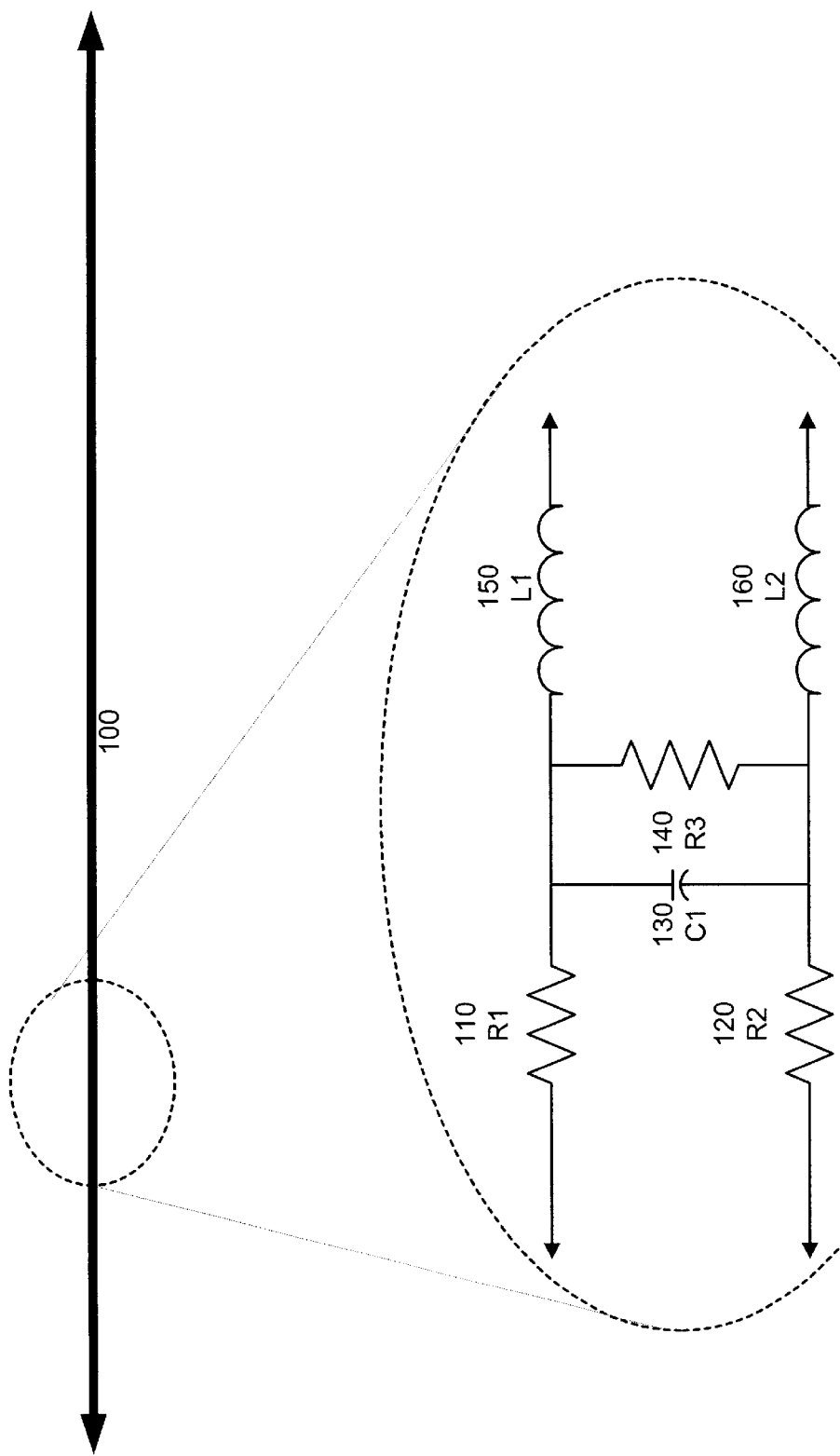
FIG. 1 is a circuit diagram representation of a transmission line.
Figure 2:
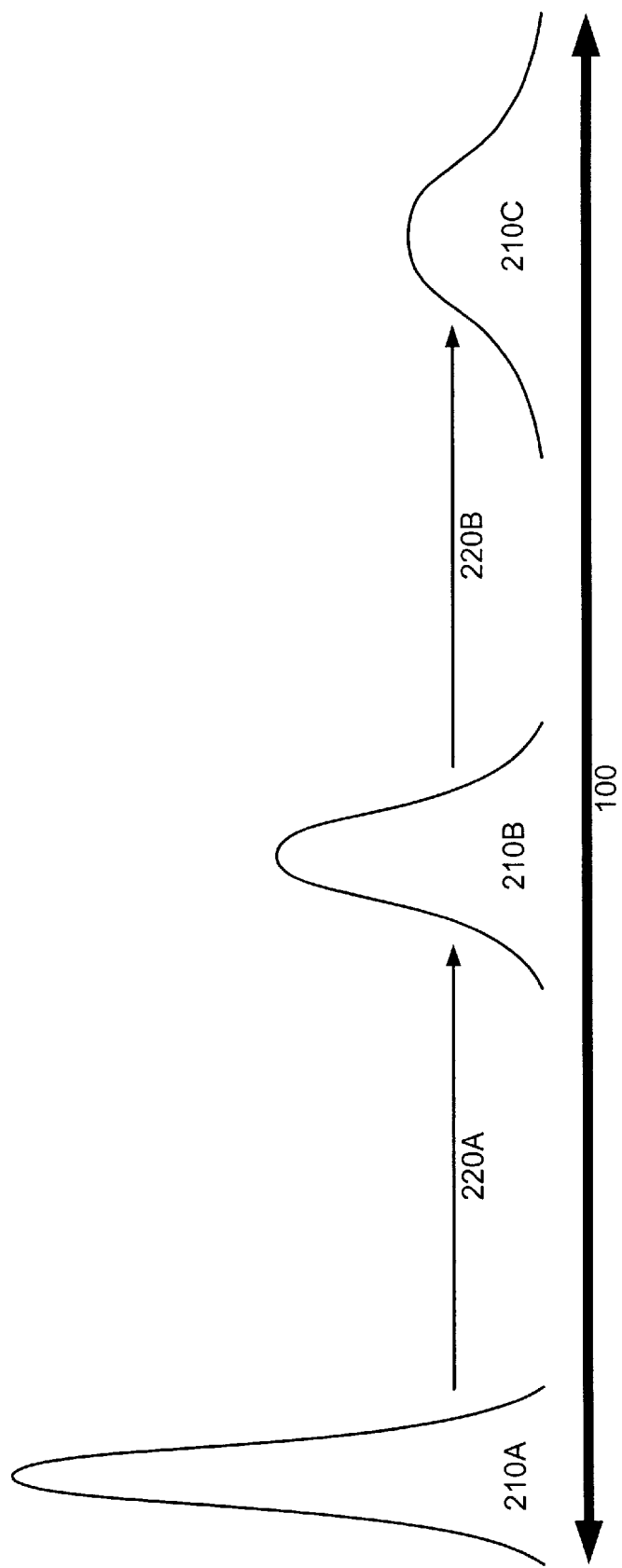
FIG. 2 is an illustration showing a signal propagating down the transmission line of FIG. 1.
Figure 3:
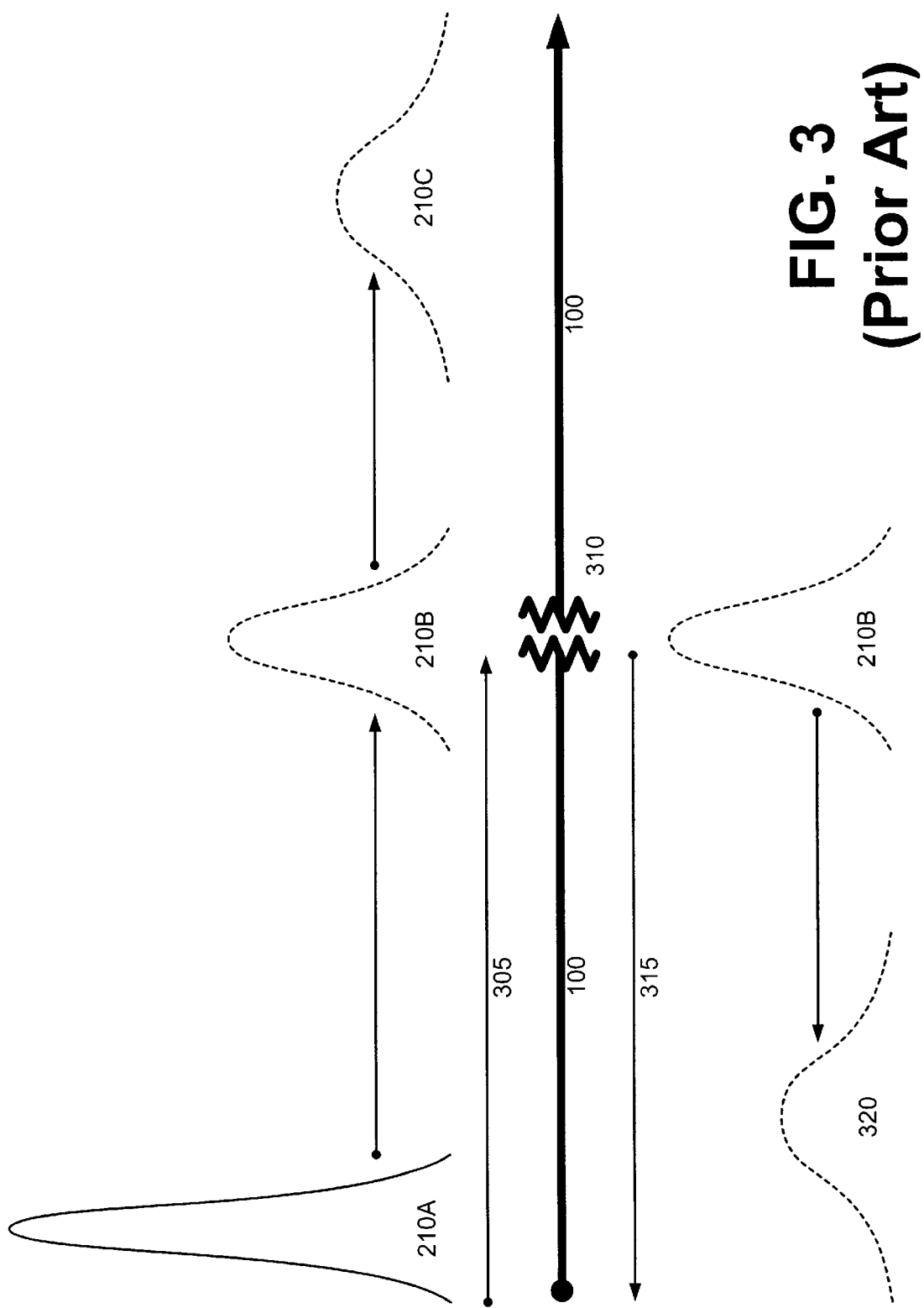
FIG. 3 is an illustration showing a fault in the transmission line of FIG. 1 and the behavior of the propagated signal when it encounters the fault.

Referring now in more detail to the drawings, in which like numerals indicate corresponding parts throughout the several views, FIGS. 1, 2, and 3 are diagrams that illustrate the theory behind the operation of time domain reflectometry (TDR); FIGS. 4, 5, 6, and 7 are diagrams that illustrate the architecture in an embodiment of an asymmetric digital subscriber line (ADSL) system configured to perform TDR measurements; and FIGS. 8, 9A, 9B, 10A, 10B, and 10C provide the method steps in an embodiment of the ADSL system configured for TDR measurements.

Theory

In a digital subscriber line system, a signal is propagated down a transmission line, which is typically a twisted pair phone line. Due to the insulating material, the spacing between the wires, and other known factors, the transmission line 100, as shown in FIG. 1, has impedance characteristics that are inherent to the transmission line 100. These impedance characteristics depend on the length, diameter, and the conductance of the material used in the transmission line 100. Thus, the transmission line 100 can be represented as an aggregate of resistors 110, 120, 140, inductors 150, 160, and capacitor 130. These impedance characteristics define how a signal would propagate down the transmission line 100.

FIG. 2 is a diagram showing an initial signal 210A propagating down the transmission line 100 of FIG. 1. The initial signal 210A can be viewed as a finite quantum of energy having an amplitude, phase, and duration (i.e., the energy spectrum of the curve). Since the transmission line 100 has certain impedance characteristics, as represented by FIG. 1, the energy of the initial signal 210A dissipates through the transmission line 100 as the initial signal 210A propagates downstream 220A. The loss of energy, therefore, changes the amplitude, phase, and duration of the initial signal 210A, thus, creating a moderately dissipated signal 210B as the signal propagates down the transmission line 100. As the moderately dissipated signal 210B further propagates downstream 220B, the signal transforms into a further dissipated signal 210C. The change in signal characteristics is determined by the specific resistances 110, 120, 140 (FIG. 1), capacitance 130 (FIG. 1), and inductances 150, 160 (FIG. 1), which characterize the transmission line 100. Moreover, the rate at which the signal propagates down the transmission line 100 is a function of the inherent characteristics of the transmission line 100 and the characteristics of the signal.

FIG. 3 is a diagram showing a disruption 310 in the transmission line 100 and the behavior of the signal 210A when it encounters the disruption 310. Since the transmission line 100 has specific impedance characteristics (see FIG. 1), a disruption 310 (e.g., cable damage, water ingress, improper installation, manufacturing flaw, change in cable type, etc.) in the transmission line 100 typically changes the impedance characteristics of the transmission line 100 by altering the resistance, inductance, or capacitance of the transmission line. Furthermore, since the signal 210A, 210B, 210C (FIG. 2) is a pulse of energy, a disruption 310 in the transmission line 100 reflects a portion of the energy back to the point of origin. The reflected signal 320, therefore, is a function of the initial signal 210A, the type and location of the disruption 310, and the inherent characteristics of the transmission line 100 (e.g., the material, length, diameter of the wire). Since the initial signal 210A is determined by the user and the reflected signal 320 can be measured, the location and type of disruption 310 can be determined as a function of the initial signal 210A and the received reflected signal 320. The application of this theory is known as time domain reflectometry (TDR).

DSL Systems

Figure 4:
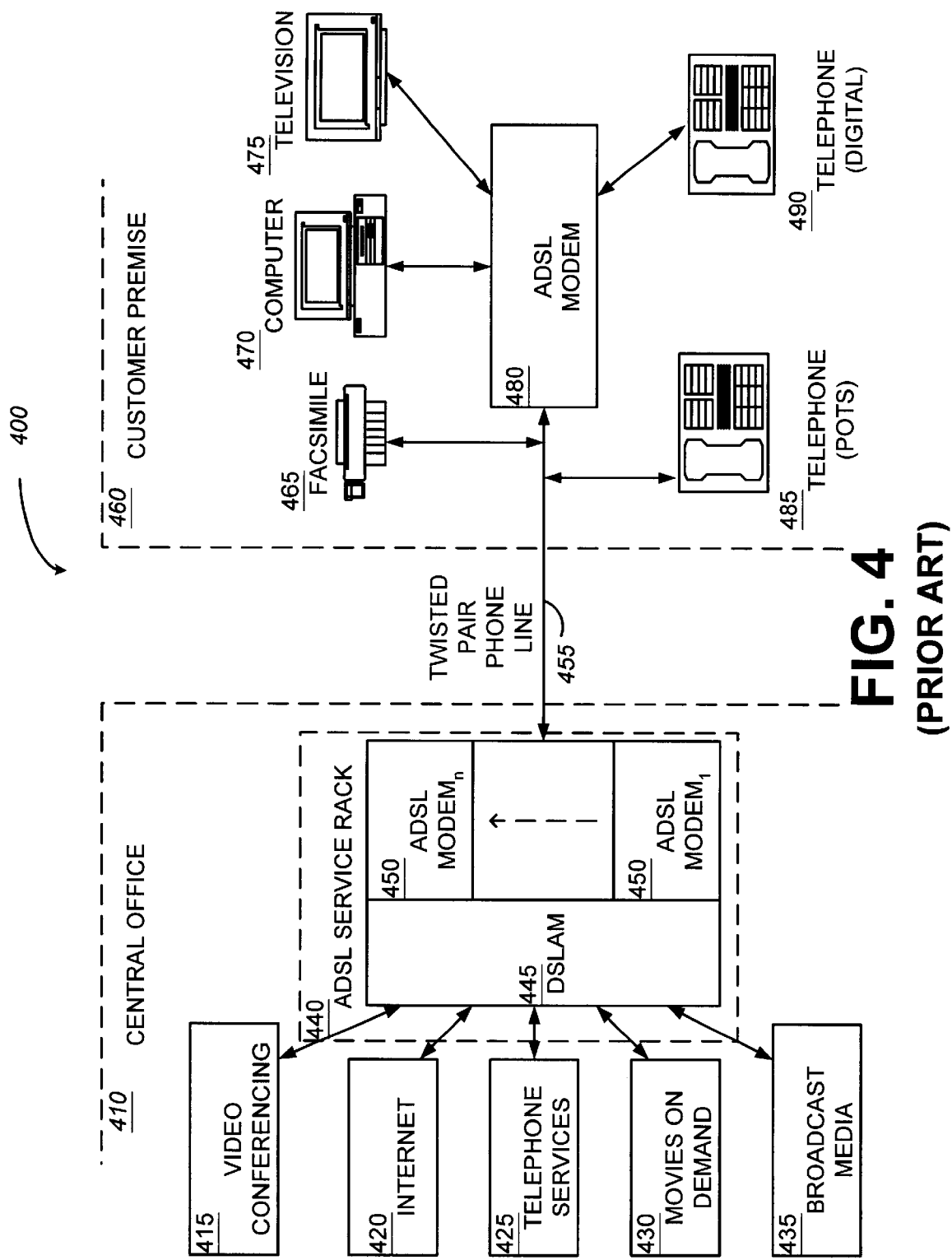
FIG. 4 is a diagram showing the architecture of a typical asymmetrical digital subscriber line (ADSL) system.

FIG. 4 is a diagram showing the architecture of an asymmetrical digital subscriber line (ADSL) system as is known in the art. Generally, the ADSL system is implemented between a central office 410 and a customer premise 460. Communication between the two sites 410, 460 takes place over a two-wire pair phone line 455 (also referred to as a local loop or a twisted pair line). The central office 410 end of the twisted pair phone line 455 is configured to provide broadband services (e.g., video conferencing 415, Internet 420, telephone services 425, movies on demand 430, broadcast media 35, etc.), which are assembled via central office ADSL modems 450 for transmission over the twisted pair phone line 455. The central office 410 assembles the signals from the broadband services at an ADSL service rack 440, which comprises a digital subscriber line access multiplexer (DSLAM) 445 and ADSL modems 450. The central office 410 assembles the broadband services via the DSLAM 445 for appropriate transformation and transmission by one or more ADSL modems 450. Each of the ADSL modems 450 may be in communication via a dedicated twisted-pair telephone line 455 with a suitably configured ADSL modem 480 at a customer premise 460.

As illustrated in FIG. 4, the DSLAM 445 and each of a plurality of ADSL modems 450 may be assembled within an ADSL service rack 440 within the central office 410. For simplicity of illustration and explanation, the ADSL communication system 400 presented in FIG. 4 is shown with a single ADSL service rack 440 for communicating each of the broadband services to n ADSL modems 450. The ADSL service rack 440 may be configured to supply conditioned resources necessary to support the operation of the n ADSL modems 450. Those skilled in the art will appreciate the scalability of the ADSL communication system 400 generally presented in FIG. 4. For example, the central office 410 may be configured with a plurality of Transmission Control Protocol/Internet Protocol (TCP/IP) routers and Asynchronous Transfer Mode (ATM) switches (not shown) that may distribute one or more broadband service signals to a plurality of DSLAMs 445. In turn, the plurality of DSLAMs 445 may further distribute the broadband service signals to a plurality of remotely located ADSL modems 480.

At the opposite end of the twisted-pair telephone line 455, the customer premise 460 may be configured with a compatible ADSL modem 480, which may be configured to process and distribute the multiple broadband services to appropriate destination devices such as a computer 470, television 475, and digital telephones 490 as illustrated. It is significant to note that that the customer premise 460 may have POTS devices such as a facsimile machine 465 and an analog (POTS) telephone 485 integrated on the twisted-pair telephone line 455 along with the ADSL modem 480. It is also feasible that the customer premise 460 may be replaced in some applications by another central office 410 or an ADSL repeater, where the POTS service may not be available or needed.

An Embodiment of a Digital Subscriber Line (DSL) System Configured for Time Domain Reflectometry (TDR)

Figure 5:
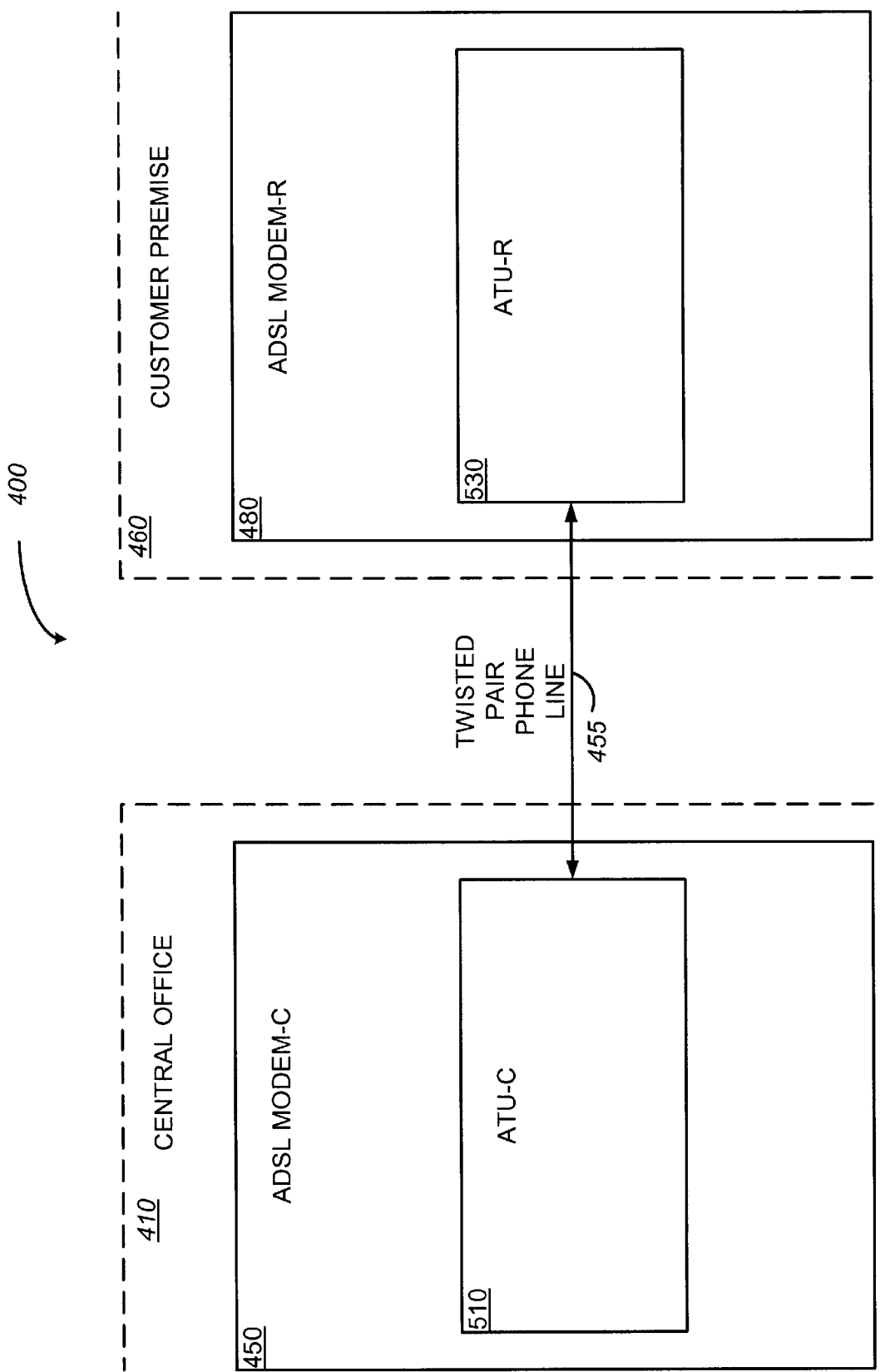
FIG. 5 is a diagram showing an ADSL transceiver unit (ATU) in the ADSL system of FIG. 4.

FIG. 5 is a diagram showing an ADSL transceiver unit (ATU) 510, 530 in the ADSL system of FIG. 4. As shown in FIG. 5, the ADSL modem 450 at the central office 410 comprises an ADSL transceiver unit (ATU-C) 510 configured to transmit and receive signals through the twisted pair phone line 455. Similarly, the ADSL modem 480 at the customer premise comprises an ADSL transceiver unit (ATU-R) 530 configured to transmit and receive signals through the twisted pair phone line 455. In the present embodiment of the invention, the ATU-C 510 and ATU-R 530, which are blocks normally present in a typical ADSL system, are used to perform time domain reflectometry (TDR) to characterize the transmission line (i.e., the twisted pair phone line 455).

Figure 6:
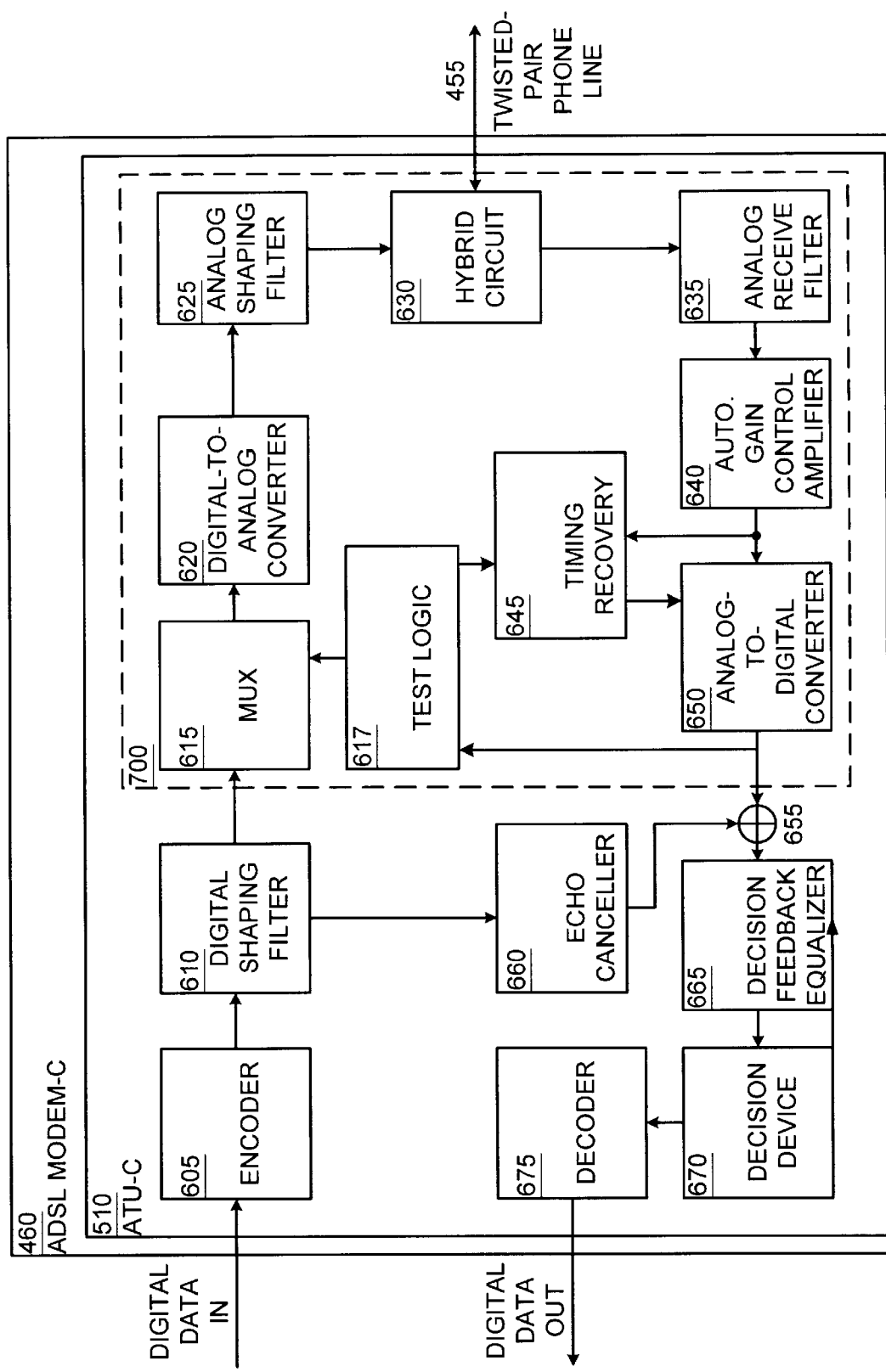
FIG. 6 is a diagram showing the ATU of FIG. 5 configured to perform time domain reflectometry (TDR).

FIG. 6 is a diagram showing the ATU-C 510 of FIG. 5 configured to perform time domain reflectometry (TDR). Although only the ATU-C 510 is shown in detail, it will be clear to one of ordinary skill in the art that the ATU-R 530 or any other ADSL modem 450, 480 may be similarly configured to perform TDR. As illustrated in FIG. 6, the ATU-C 510 may comprise an encoder 605, a digital shaping filter 610, a multiplexer 615, a test logic circuit 617, a digital-to-analog converter (DAC) 620, an analog shaping filter 625, and a hybrid circuit 630 in the upstream data path. Conversely, an ATU-C 510 may comprise a hybrid circuit 630, an analog receive filter 635, an automatic gain control amplifier (AGC) 640, a timing recovery circuit 645, an analog-to-digital converter (ADC) 650, an echo canceller 660, a decision feedback equalizer 665, a decision device 670, and a decoder 675 in the downstream data path.

In this regard, the upstream data transmission portion of the ATU-C 510, during normal operation, may function as follows. The bits of the digital data input signal may be encoded into a complex data symbol in encoder 605. The complex data symbols may be forwarded to a digital shaping filter 610 and an echo canceller 660. The digital shaping filter 610 may take the form of a finite impulse response (FIR) filter selected and used to shape the frequency spectrum across a particular ADSL communication channel. The output of the digital shaping filter 610 may then be forwarded to the DAC 620 through the multiplexer 615. Having converted the digitally filtered complex data symbols representing the digital input data stream in the DAC 620 to an analog signal, the analog representation of the digital data input stream may be further processed by an analog shaping filter 625. In this regard, analog shaping filter 625 may take the form of a Butterworth lowpass filter to control out-of-band energy present in the analog signal. The filtered transmit signal may then be coupled to the twisted pair telephone line 455 via the hybrid circuit 630. The hybrid circuit 630 may comprise two unidirectional ports (one for data transmission and one for data reception) and one bi-directional port. The bidirectional port may be integrated with the twisted-pair telephone line 455. If the impedance of the twisted-pair matches the design impedance of the hybrid circuit 630, there will be perfect isolation between the transmitting and receiving ports within hybrid circuit 630. For this ideal case, the hybrid circuit 630 return loss is infinity. In reality, the line impedance is a variable of frequency and varies significantly between individual CSA loops.

Having briefly described the upstream functional operation of ATU-C 510, reference will now be directed to downstream data transmission within ATU-C 510 for the normal operation in a DSL system. In this regard, a Butterworth low-pass filter may also be used for the analog receive filter 635. The function of the analog receive filter 635, like its counterpart in the transmission path of ATU-C 510 is to reduce out-of-band noise. Having removed the low-frequency out-of-band noise in the analog receive filter 635, the filtered analog data stream may be forwarded to the AGC 640. The AGC 640 may be necessary to bring the received signal magnitude close to that of the normal transmit signal level for subsequent digital conversion and processing. Having adjusted the magnitude of the received signal in AGC 640, the filtered and amplified receive signal may be processed through a timing recovery circuit 645. The timing recovery circuit 645 typically coordinates the sampling clocks used to process data in both DAC 620 in the upstream data path, as well as, ADC 650 in the downstream data path. The ADC 650 may be synchronized to the DAC 620 through the timing recovery circuit 645 such that upstream and downstream data symbols are synchronized within the ATU-C 510.

Once the received data has been converted to a digital data stream by the ADC 650, digital signal processing of the complex data symbols encoded within the received signal path may be processed. After analog-to-digital conversion, the output of the echo canceller 660 from the upstream data path may be mathematically combined with the received signal. The combination may take place in summer 655.

Echo canceller 660 may be designed to resemble the equivalence of the echo path as defined by both the digital and analog shaping filters 610, 625 the DAC 620, the hybrid circuit 630, the analog receive filter 635, the AGC 640, the timing recovery circuit 645, and the ADC 650. Possible phase jitter between the transmit signal and the received signal may be reduced by bit stuffing as defined by the ADSL frame structure. In typical configurations, the echo path transfer function is identified with an adaptive signal processing algorithm.

The digitized and echo-canceled received signal may be further filtered by a decision feedback equalizer 665 before being forwarded to a decision device 670. The decision feedback equalizer 665 may comprise a feed-forward filter and a feedback filter. The feed-forward filter equalizes the precursor of the CSA loop channel impulse response, while the feedback filter cancels the effect of the post-cursor of the channel impulse response. The decision feedback equalizer is necessary for the ATU-C 510 to maintain minimal noise enhancement during the channel equalization process. The decision device 670 may take the form of a threshold detector configured to correspond to the discrete voltage levels used by the line code. After signal processing in the decision device 670, the received symbols are converted back into signal bits by the decoder 675 to create a digital data bit stream.

In order to perform TDR using these components, the test logic circuit 617 may be activated and the analog front end 700, which is normally present in a DSL ATU 510 and used in normal DSL operation, may function as the TDR test equipment. Although, for the purpose of clarity, FIG. 6 depicts the test logic circuit 617 as a separate hardware component, in a preferred embodiment of the invention, the test logic circuit 617 would comprise digital signal processing (DSP) components inherent to a DSL modem, and the functionality of the test logic circuit 617 would be implemented using software.

Figure 7:
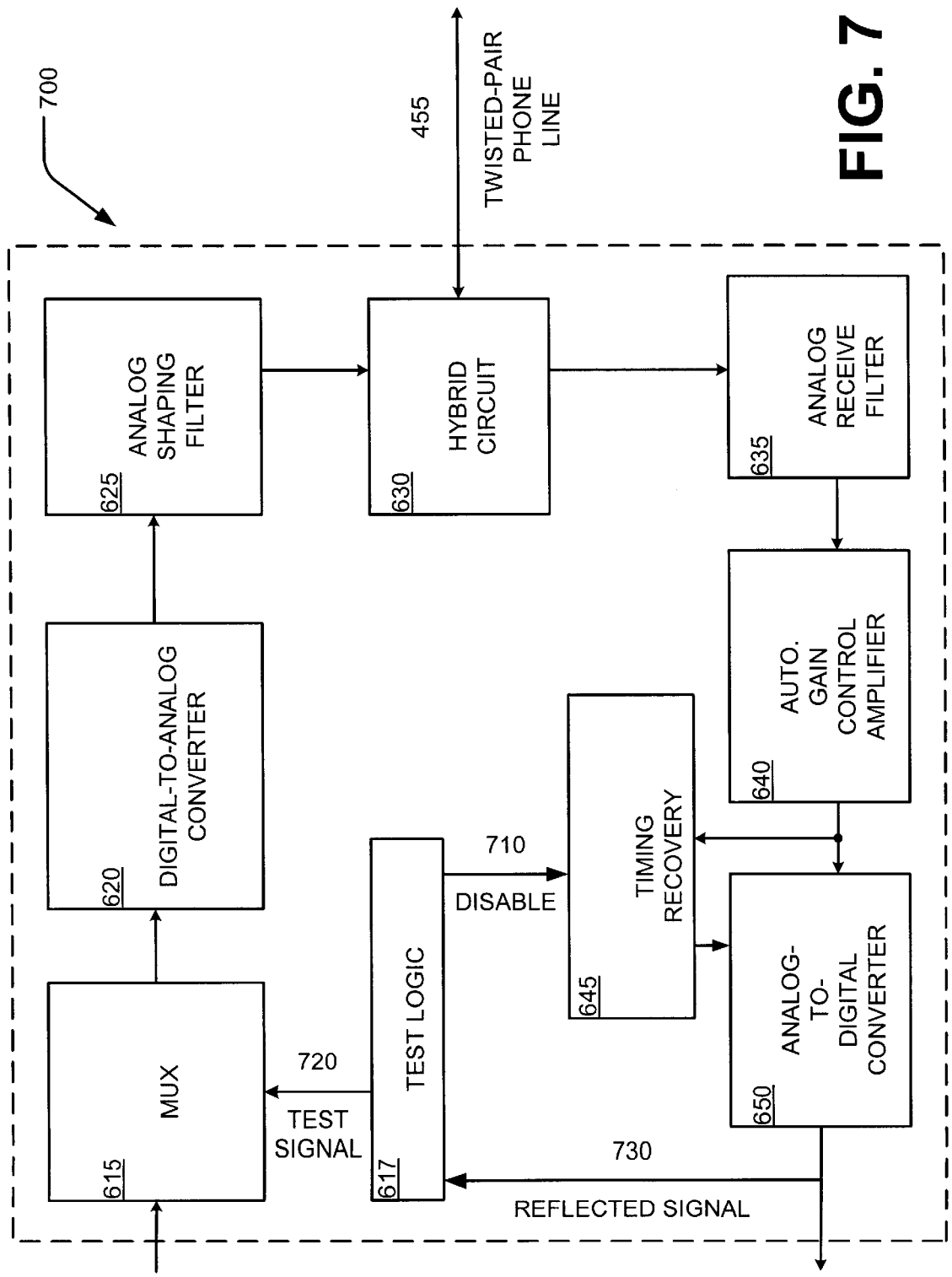
FIG. 7 is a diagram showing an exploded view of the test circuitry within the ATU of FIG. 6.

FIG. 7 is a diagram showing certain components of the analog front end 700 of FIG. 6 configured to perform TDR. Similar to FIG. 6, the test logic circuit 617 of FIG. 7, in a preferred embodiment, would comprise DSP components inherent to a DSL modem, and the functionality of the test logic circuit 617 would be implemented in software. With this in mind, TDR operation in a DSL modem will be described with reference to FIG. 7. In order to perform TDR, the test logic circuit 617 may generate a disable signal 710 to disable the timing recovery circuit 645. Additionally, the test logic circuit 617 may generate a test signal 720, which may take the form of an impulse function or a step function. Due to their simplicity, an impulse function or step function may be generated easily by the test logic circuit. Further benefits of using impulse or step functions are shown below in conjunction with the method of the invention. The test signal 720 may then be forwarded to the multiplexer 615, and subsequently to the DAC 620, which converts the test signal 720 into an analog signal. In using the analog front end 700 for TDR measurements, it is desirable to maintain the characteristics of the test signal 720. Thus, it is desirable for the analog representation of the digital test signal to pass through the analog shaping filter 625 with a minimal amount of filtering. However, since the characteristics of the analog shaping filter 625 are typically known, these known characteristics may be used in the signal processing phase of the TDR measurements (described below). The filtered transmit signal may then be transmitted to the twisted pair telephone line 455 via the hybrid circuit 630.

Having briefly described the upstream functional operation of the analog front end 700 configured to produce a test signal 710, reference will now be directed to downstream data transmission by the analog front end 700. In this regard, the reflected signal is received at the hybrid circuit 630. Subsequently, the signal is filtered through an analog receive filter 635. The function of the analog receive filter 635, like its counterpart in the transmission path, is to reduce out-of-band noise. Also, similar to the analog shaping filter 625, it is desirable to have a minimal amount of filtering of the received signal, thus, minimally affecting the signal characteristics of the received signal. This, however, may also be considered in the processing phase of the TDR measurements (described below). Subsequent to filtering at the analog receive filter 630, the filtered analog data stream may be forwarded to the AGC 640. The AGC 640 may be necessary to bring the received signal magnitude close to that of the normal transmit signal level for subsequent digital conversion and processing. Having adjusted the magnitude of the received signal in AGC 640, the filtered and amplified receive signal may be converted to a digital data stream by the ADC 650 to produce a sampled signal 730. This reflected signal 730 may be received at the test logic circuit 617 for processing by the test logic circuit 617.

An Embodiment of the Method for Time Domain Reflectometry (TDR) in a Digital Subscriber Line (DSL) System Having described the system for performing time domain reflectometry (TDR) in a digital subscriber line (DSL) system, an example method for performing TDR measurements is described below.

FIG. 8 is a flow chart showing the method steps for TDR measurements in a DSL system. Broadly viewed, the method comprises a control step 810 (since the test signal is controlled by the user during this stage of the method) and a variable step 820 (since the signal is variable during this stage of the method and depends on the characteristics of the twisted pair phone line 455 (FIG. 4)). The control step 810 may be viewed as a two-step process of creating, in step 830 a test signal 720 (FIG. 7) at the test logic circuit 617 (FIG. 7) of the ADSL transceiver unit (ATU-C) 510 (FIG. 5) and transmitting, in step 840, the test signal from the analog front end 700 (FIG. 7) of the ATU-C 510 (FIG. 5) to the twisted pair phone line 455 (FIG. 4). The variable step 820 may also be viewed as a two-step process of receiving, in step 850, the reflected signal 730 (FIG. 7) from the twisted pair phone line 455 (FIG. 4) at the ATU-C 510 (FIG. 5) and characterizing, in step 860, the twisted pair phone line 455 (FIG. 4) using the received signal 730 (FIG. 7).

Figure 9A:
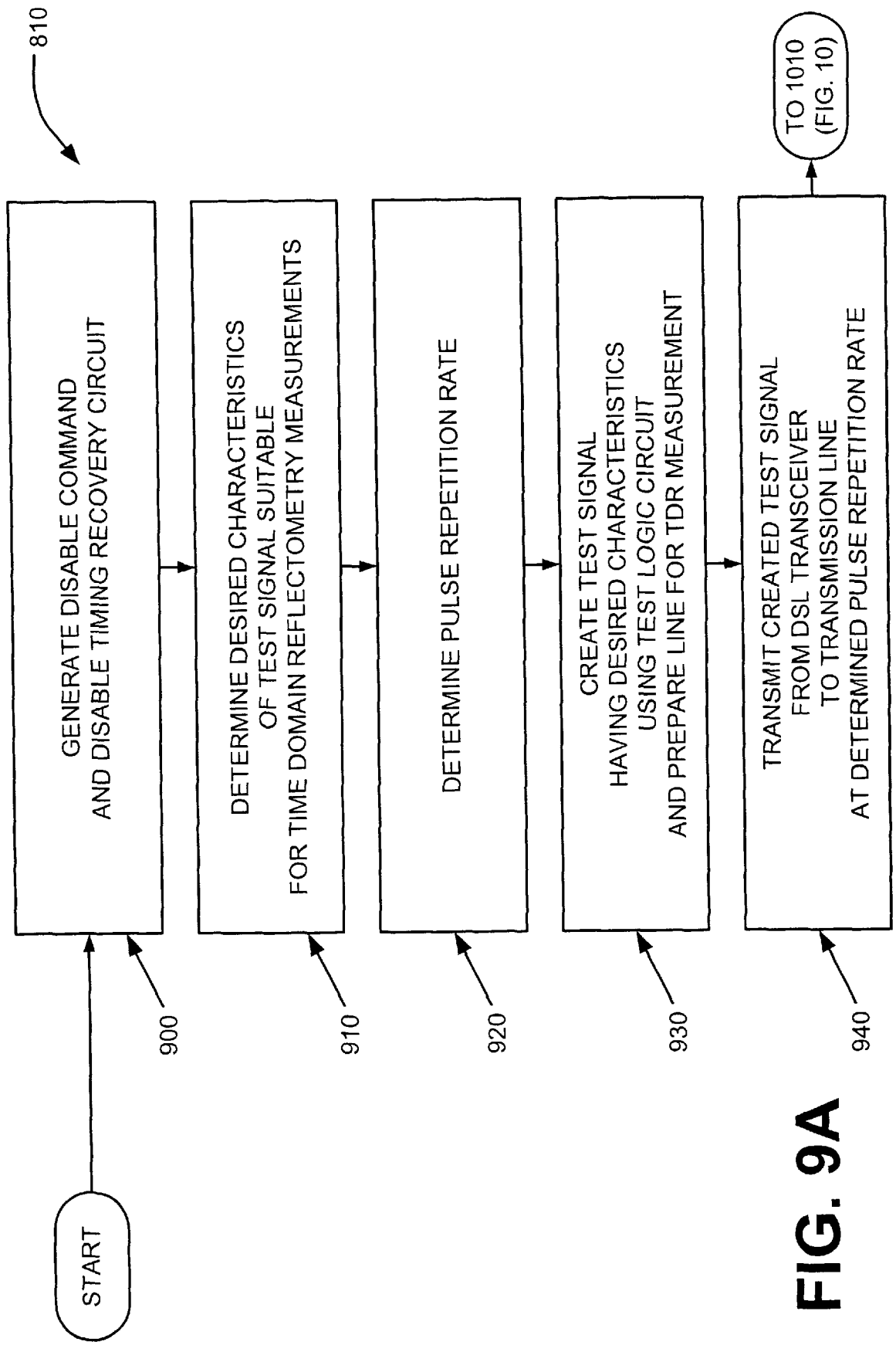
FIG. 9A is a flow chart showing the steps for transmitting the test signal of FIG. 8 in more detail.

FIG. 9A is a flow chart showing the control step 810 of FIG. 8 in more detail. Initially, the timing recovery circuit 645 (FIG. 7) is disabled by the test logic circuit 617 (FIG. 7) for time domain reflectometry (TDR) measurements. The user then determines, in step 910, the desired characteristics of the test signal 720 (FIG. 7) suitable for TDR. The user further determines, in step 920, the pulse repetition rate for TDR measurements. The test signal 720 (FIG. 7) having the desired characteristics is then created and the line prepared for TDR measurements in step 930 by the test logic circuit 617 (FIG. 7). Once the test signal is created and the line prepared 930, the signal is then transmitted, in step 940, from the ATU-C 510 (FIG. 5) to the twisted pair phone line 455 (FIG. 4) at the pulse rate determined in step 920. Although in this embodiment the determination of the desired test signal 720 (FIG. 7) characteristics comes before the determination of the pulse repetition rate, it will be clear to one of ordinary skill in the art that these two steps may be interchanged so that the pulse repetition rate is determined before the pulse characteristics. Also, it will be clear to one of ordinary skill in the art that the disable command 710 (FIG. 7) used to disable the timing recovery circuit 645 (FIG. 7), although shown as the initial step 900 in this embodiment, may be generated at any time prior to the transmission 940 of the test signal 720 (FIG. 7) and, further, the timing recovery circuit 645 (FIG. 7) may be disabled at any time prior to the transmission 940 of the test signal 720 (FIG. 7).

FIG. 9B is a flow chart showing the steps for creating the test signal and preparing the line for testing (step 930 of FIG. 9A) in more detail. The shape or function of the test signal to be used in the TDR measurement is determined in step 932. As mentioned above with reference to FIG. 7, a typical signal used for TDR operation is either a step function or an impulse function with a repetition period much longer than the expected echo duration. Thus, once the shape of the desired test signal 720 (FIG. 7) is determined 932, the test logic circuit 617 (FIG. 7) prepares, in step 934, a linear buffer of data values representing the test signal 720 (FIG. 7). For example, a step function may be generated by preparing 934 the linear buffer with a series of data values of minimum amplitude followed by a series of data values having maximum amplitude. Alternatively, an impulse function may be generated by preparing 934 the linear buffer with one maximum amplitude code surrounded by minimum amplitude codes. The responses to these step and impulse functions simplify further processing in the sense that their convolution is easy to calculate, however they may not be the best solution in general, and other pulse shapes could be used as long as a corresponding inverse method exists. Thus, although only the impulse and step functions are described in this embodiment, it will be clear to one of ordinary skill in the art that various shapes and functions may be used as the test signal 720 (FIG. 7). Once the test signal is determined and stored in a linear buffer in step 934, the test logic circuit 617 prepares the line for TDR measurements by transmitting, in step 936, a constant preamble for a predetermined number of sample periods, therefore allowing the line to enter quiescent mode (i.e., the line is cleared of potentially disruptive or undesired signals).

Figure 10A:
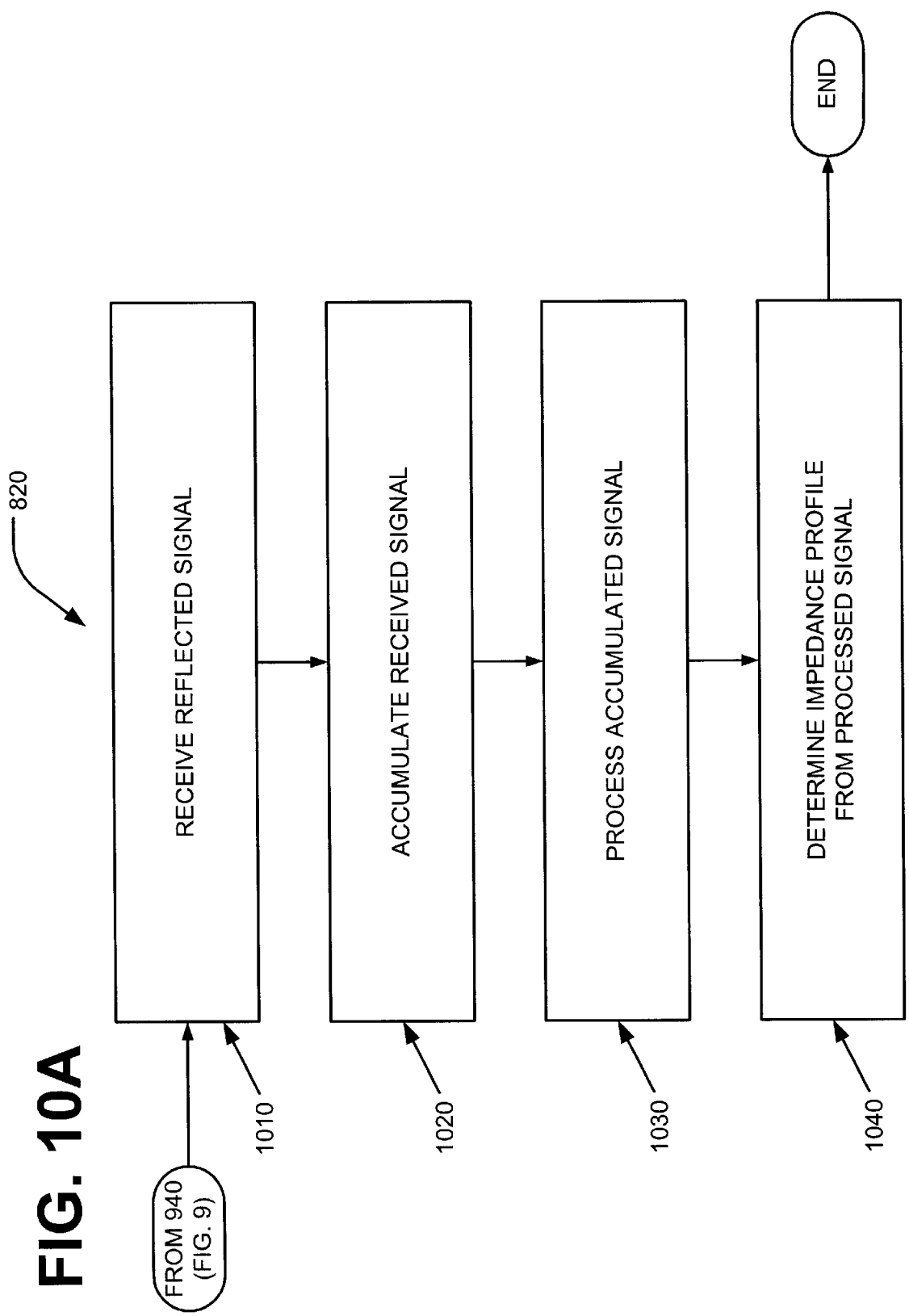
FIG. 10A is a flow chart showing the steps for receiving the test signal of FIG. 8 in more detail.

FIG. 10A is a flow chart showing the steps for variable step 820 of FIG. 8 in more detail. Once the signal has been transmitted 840 (FIG. 8), the system waits for the transmitted signal to be reflected back to the point of origin (i.e., the ADSL transceiver unit (ATU-C) 510). Since multiple signals have been transmitted at a predetermined repetition rate (see FIG. 9A), the system receives, in step 1010, the reflected signals and accumulates, in step 1020, the received signals. Of specific importance for the correct operation of the processing step (described below) is the availability of a correct received signal 730 (FIG. 7). In general, this implies the ability to transmit 840 (FIG. 8) a test signal 720 (FIG. 7) and receive 850 (FIG. 8) a reflected signal 730 (FIG. 7) with minimal (and known degradation). A known degradation may be partially compensated, but degrades the accuracy (by degrading the signal-to-noise ratio (SNR)). One way to obtain a correct representation of the reflected signal 730 (FIG. 7) is to sample the received signal 730 (FIG. 7) at a high sampling rate. In one embodiment of the invention, the timing recovery is used in a non standard way to increase the equivalent sampling frequency. While in test mode, the timing recovery is disabled and the receiver sample frequency is the transmit sample frequency offset by a known phase difference using a Digital Delay Loop (DDL) circuitry. The received signal, from step 1010, is accumulated, in step 1020, for all possible offsets generated by the DDL. This signal averaging technique increases the SNR and allows for a higher quality accumulated signal that may be processed in step 1030. From the processed signal of step 1030, the system further determines, in step 1040, the impedance profile of the twisted pair phone line 455 (FIG. 4).

Figure 10B:
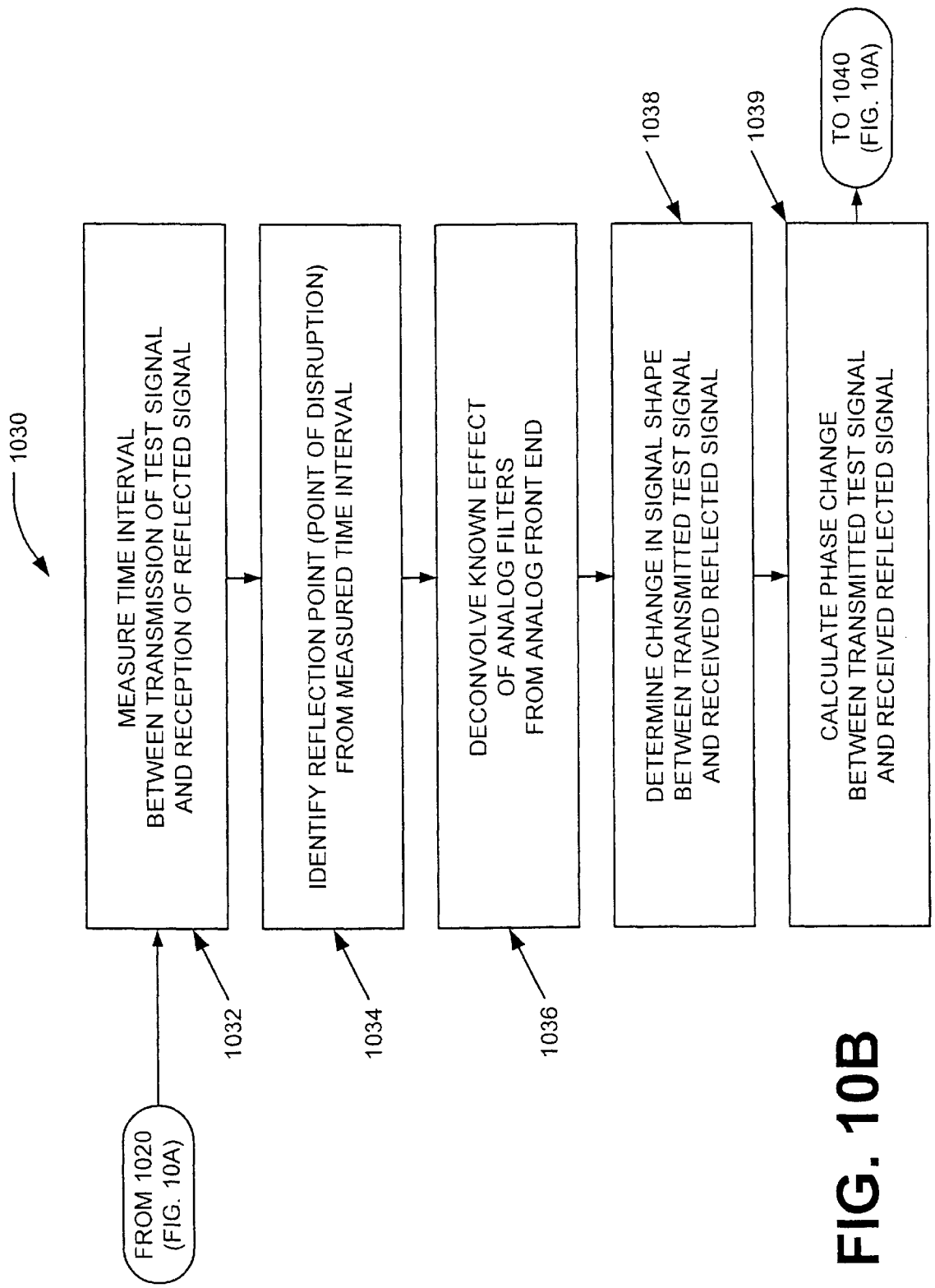
FIG. 10B is a flow chart showing the steps for processing the signal of FIG. 10A in more detail.

FIG. 10B is a flow chart showing the steps for processing the signal of FIG. 10A in more detail. Since the time of the test signal 720 (FIG. 7) transmission is known (see FIG.

9A), a time interval may be measured, in step 1032, from the time difference between the transmission 940 (FIG. 9A) of the test signal 720 (FIG. 7) and the reception 1010 (FIG. 10A) of the reflected signal 730 (FIG. 7). Once the time interval has been measured 1032, the point of disruption 310 (FIG. 3) may be identified, in step 1034, as a function of the measured time interval and the known line characteristics (see FIG. 1).

In addition to identifying 1034 the reflection point (or point of disruption 310 (FIG. 3)), the known effects of the analog filters 625, 635 (FIG. 7) may be deconvolved, in step 1036, to produce an estimate of the actual reflected signal without the broadening effects of these filters 625, 635 (FIG. 7). Once these effects have been deconvolved 1036, changes in the shape of the signal may be determined, in step 1038, by examining the difference between the shape of the transmitted signal 720 (FIG. 7) and the reflected signal 730 (FIG. 7). Furthermore, since a disruption 310 (FIG. 3) in the line may cause impedance changes, the reflected signal 730 (FIG. 7) may possess different phase characteristics from the transmitted test signal 720 (FIG. 7). Thus, the phase change between the transmitted signal 720 (FIG. 7) and the reflected signal 730 (FIG. 7) may be calculated, in step 1039, by comparing the phase of the reflected signal 730 (FIG. 7) and transmitted signal 720 (FIG. 7).

Figure 10C:
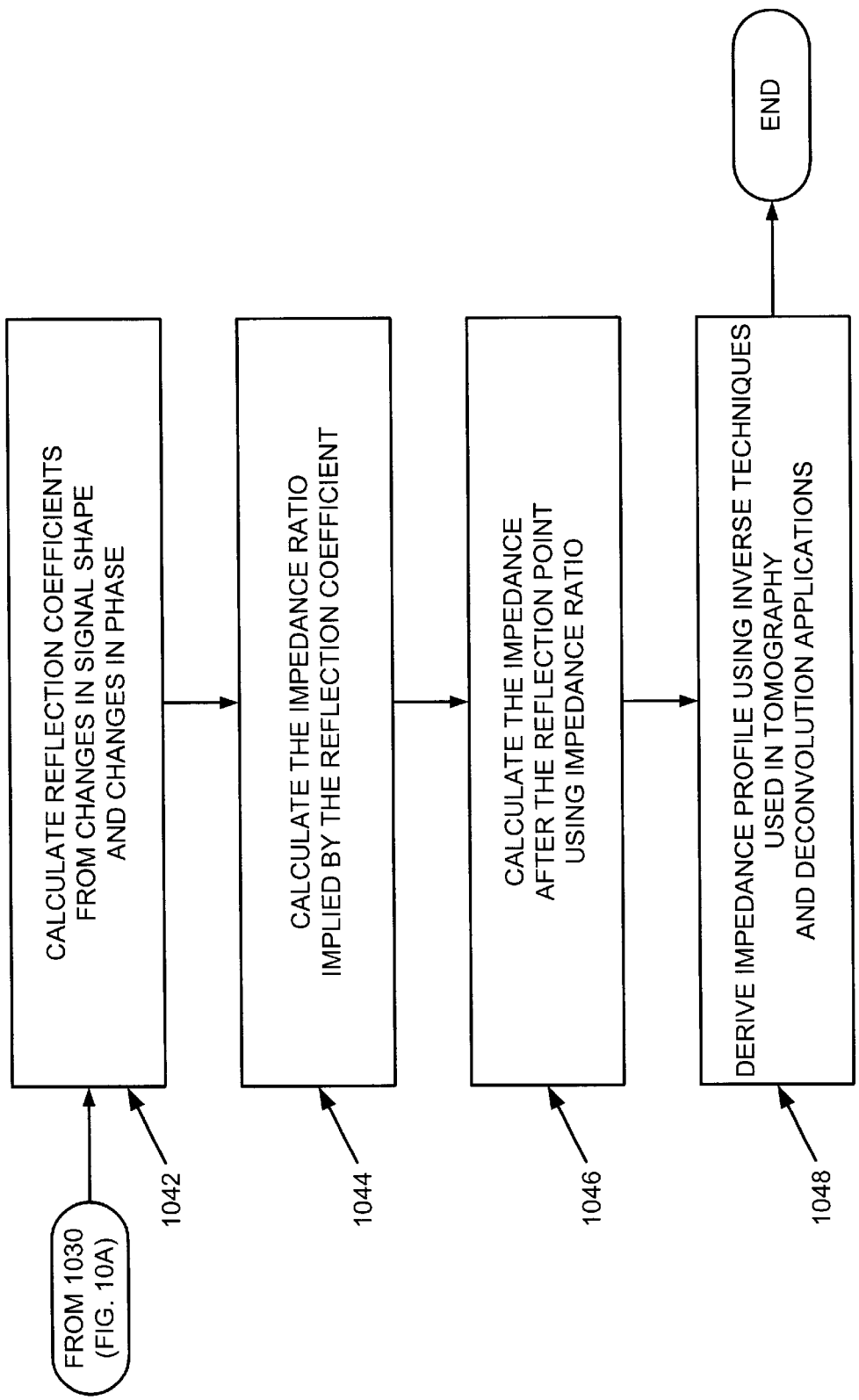
FIG. 10C is a flow chart showing the steps for determining the impedance profile of FIG. 10A in more detail.

From the processing steps of FIG. 10B, the reflection point, changes in signal shape, and changes in signal phase are known. These known parameters are used in determining the impedance profile. FIG. 10C is a flow chart showing the steps for determining the impedance profile of FIG. 10A in more detail. From the changes in the signal shape and changes in signal phase, reflection coefficients may be calculated in step 1042. These calculated reflection coefficients are indicative of changes in the impedance of the line due to a disruption 310 (FIG. 3). Recalling from FIG. 1 that the transmission line 100 (FIG. 1) may be represented by series and parallel combinations of resistances 110, 120, 140 (FIG. 1), inductances 150, 160 (FIG. 1), and capacitance 130 (FIG. 1), any disruption 310 (FIG. 3) may change the resistor 110, 120, 140 (FIG. 1), inductor 150, 160 (FIG. 1), or capacitor 130 (FIG. 1) values. Thus, the reflection coefficients represent these changes. Once the reflection coefficients have been calculated 1042, the impedance ratio, which is implied by the reflection coefficients, may be further calculated in step 1044. Additionally, the impedance of the line after the reflection point may be calculated, in step 1046, from the calculated impedance ratio of step 1044. It is worthwhile to note that different types of disruptions 310 (FIG. 3) (e.g., cable damage, water ingress, improper installation, manufacturing flaw, change in cable type, etc.) may affect the line 100 (FIG. 3) in varying degrees. Thus, it may be possible to determine the type of disruption 310 (FIG. 3) from the reflection coefficients and derive, in step 1048, the impedance profile using inverse techniques that are commonly used in tomography or deconvolution applications. These techniques are well known in the art and need not be further discussed here.

While particular embodiments of the invention have been disclosed in detail in the foregoing description and drawings for purposes of example, it will be understood by those skilled in the art that variations and modifications thereof can be made without departing from the scope of the invention as set forth in the following claims. Specifically, although the preferred embodiment discloses a method of performing TDR using time domain analysis techniques, it will be clear to one of ordinary skill in the art that analogous techniques in frequency domain analysis may be employed to achieve a substantially similar result. Furthermore, it will be clear to one of ordinary skill in the art that while the specific circuitry in the system for performing TDR measurements are incorporated into the analog front end of a DSL modem, these components may be relocated without having a substantial effect on the scope of the invention. Additionally, several steps in the method for performing TDR measurements may be rearranged without substantially altering the method. Moreover, although the preferred embodiment of the invention describes the test logic circuit as inherent components of a DSL modem that are manipulated using software, it will be clear to one of ordinary skill in the art that the circuit, broadly denoted, may be implemented by dedicated hardware, hardware and microcode, software, or a combination of hardware and software without deviating from the scope of the claimed invention. Thus, it is the inventor's intent to cover all embodiments of the invention as described by the following claims.

What is claimed is:

1. A test logic circuit in a digital subscriber line (DSL) modem configured to perform time domain reflectometry (TDR) measurements on a transmission line, the test logic circuit comprising:

means for preparing the transmission line for the TDR measurements;

means for creating a predetermined test signal;

means for transmitting the predetermined test signal to the transmission line at a predetermined repetition rate;

means for receiving reflected signals;

means for accumulating the received reflected signals;

means for measuring a time interval between transmission of the test signals and reception of the reflected signals;

means for identifying the location of disruptions from the measured time intervals;

means for deconvolving known effects of the DSL modem from the accumulated signal to produce a deconvolved signal;

means for determining changes in shape between the transmitted test signal and the deconvolved signal;

means for determining changes in phase between the transmitted test signal and the deconvolved signal; and means for deriving an impedance profile of the transmission line from the differences in the shape and phase between the test signal and the deconvolved signal.

2. A system for characterizing transmission lines, comprising:

a transmission line; and a digital subscriber line (DSL) modem configured to perform time domain reflectometry (TDR) measurements on the transmission line, wherein the TDR measurements of the DSL modem are performed by an analog front end configured to perform TDR measurements within the DSL modem, wherein the analog front end further comprises:

a transceiver configured to transmit a TDR test signal to a transmission line, the transceiver further configured to receive a reflected signal from the transmission line; and a test logic circuit configured to produce the TDR test signal and send the test signal to the transceiver, the test logic circuit further configured to receive the reflected signal from the transceiver, the test logic circuit further configured to process the reflected signal, wherein the test logic circuit is further configured to deconvolve known system effects from the reflected signal to produce a deconvolved signal.

3. The system of claim 2, further configured to derive an impedance profile of the transmission line from the processed reflected signal.

4. The system of claim 2, wherein the TDR test signal is an impulse function.

5. The system of claim 2, wherein the TDR test signal is a step function.

6. The system of claim 2, wherein the test logic circuit is further configured to measure a time interval between transmission of the test signal and reception of the reflected signal.

7. The system of claim 6, wherein the test logic circuit is further configured to identify a reflection point from the measured time interval.

8. The system of claim 2, wherein the test logic circuit is further configured to determine a change in signal shape between the transmitted signal and the deconvolved signal.

9. The system of claim 8, wherein the test logic circuit is further configured to determine a change in phase between the transmitted signal and the deconvolved signal.

10. The system of claim 9, wherein the test logic circuit is further configured to calculate reflection coefficients from the change in signal shape and the change in signal phase.

11. The system of claim 10, wherein the test logic circuit is further configured to calculate an impedance ratio from the calculated reflection coefficients.

12. The system of claim 11, wherein the test logic circuit is further configured to calculate an impedance of the transmission line beyond the location of the reflection point.

13. The system of claim 12, wherein the test logic circuit is further configured to derive an impedance profile from the calculated impedance coefficients using deconvolution techniques.

14. The system of claim 2, wherein the test logic circuit is further configured to determine a change in phase between the transmitted signal and the deconvolved signal.

15. A system for characterizing transmission lines, comprising:
means for transmitting a predetermined test signal from a DSL modem to a transmission line;
means for receiving a reflected signal from the transmission line at the DSL modem;
means for determining transmission line characteristics as a function of the reflected signal and the transmitted signal, the means for determining transmission line characteristics being disposed within the DSL modem;
means for preparing the transmission line for TDR measurements, wherein the means for preparing the transmission line further comprises means for transmitting a predetermined preamble for a predetermined sample period to the transmission line; and
means for creating the predetermined test signal.

16. The system of claim 15, wherein the predetermined preamble comprises a sequence of null signals.

17. The system of claim 15, wherein the means for creating the predetermined test signal further comprises:
means for determining desired characteristics of the test signal; and
means for preparing a line buffer of data values from the determined desired characteristics of the test signal.

18. The system of claim 15, wherein the means for transmitting the predetermined test signal further comprises:
means for determining a pulse repetition rate; and
means for transmitting the test signal at the predetermined pulse repetition rate.

19. The system of claim 15, wherein the means for determining transmission line characteristics further comprises:

means for accumulating the received signal;
means for processing the accumulated signal; and
means for determining the impedance profile from the processed signal.

20. The system of claim 19, wherein the means for processing the accumulated signal further comprises means for measuring a time interval between transmission of the test signal and reception of the reflected signal.

21. The system of claim 20, wherein the means for processing the accumulated signal further comprises means for identifying a reflection point from the measured time interval.

22. The system of claim 19, wherein the means for processing the accumulated signal further comprises means for deconvolving known system effects from the accumulated signal to produce a deconvolved signal.

23. The system of claim 22, wherein the means for processing the accumulated signal further comprises means for determining a signal shape difference between the transmitted signal and the deconvolved signal.

24. The system of claim 22, wherein the means for processing the accumulated signal further comprises means for calculating a phase difference between the transmitted test signal and the deconvolved signal.

25. The system of claim 23, wherein the means for processing the accumulated signal further comprises means for calculating a phase difference between the transmitted test signal and the deconvolved signal.

26. The system of claim 25, wherein the means for processing the accumulated signal further comprises means for calculating reflection coefficients from the signal shape difference and the phase difference.

27. The system of claim 26, wherein the means for processing the accumulated signal further comprises means for calculating an impedance ratio from the calculated reflection coefficients.

28. The system of claim 27, wherein the means for processing the accumulated signal further comprises means for calculating an impedance of the transmission line beyond the location of the reflection point using the calculated impedance ratio.

29. The system of claim 28, wherein the means for processing the accumulated signal further comprises means for deriving an impedance profile using deconvolution techniques.

30. A method for characterizing a DSL transmission line using a DSL modem, comprising the steps of:
transmitting a predetermined test signal from the DSL modem to a transmission line;
receiving a reflected signal from the transmission line at the DSL modem;
determining within the DSL modem transmission line characteristics as a function of the reflected signal and the transmitted signal;
preparing the transmission line for TDR measurements, wherein the step of preparing the transmission line further comprises:
generating a disable command at a test logic circuit, the disable command configured to disable a timing recovery circuit in the DSL modem; and
transmitting a predetermined preamble for a predetermined sample period to the transmission line; and
creating the predetermined test signal.

31. The method of claim 30, wherein the preamble comprises a series of null signals.

32. The method of claim 30, wherein the creating step further comprises the steps of:

determining desired characteristics of the test signal; and preparing a line buffer of data values from the determined desired characteristics of the test signal.

33. The method of claim 30, wherein the transmitting step further comprises the steps of:

determining a pulse repetition rate; and transmitting the test signal at the determined pulse repetition rate.

34. The method of claim 30, wherein the determining step further comprises the steps of:

accumulating the received signal;

processing the accumulated signal; and determining the impedance profile from the processed signal.

35. The method of claim 34, wherein the processing step comprises the step of measuring a time interval between transmission of the test signal and reception of the reflected signal.

36. The processing step of claim 35, further comprising the step of identifying a reflection point from the measured time interval.

37. The processing step of claim 34, further comprising the step of deconvolving known system effects from the accumulated signal to produce a deconvolved signal.

38. The processing step of claim 37, further comprising the step of determining a signal shape difference between the transmitted test signal and the deconvolved signal.

39. The processing step of claim 37, further comprising the step of calculating a phase difference between the transmitted test signal and the deconvolved signal.

40. The processing step of claim 38, further comprising the step of calculating a phase difference between the transmitted test signal and the deconvolved signal.

41. The processing step of claim 40, further comprising the step of calculating reflection coefficients from the signal shape difference and the phase difference.

42. The processing step of claim 41, further comprising the step of calculating an impedance ratio from the calculated reflection coefficients.

43. The processing step of claim 42, further comprising the step of calculating an impedance in the transmission line beyond the location of the reflection point using the calculated impedance ratio.

44. The processing step of claim 43, further comprising the step of deriving an impedance profile using deconvolution techniques.

* * * * *